US012617618B2

(12) United States Patent
Della Torre et al.

(10) Patent No.:  US 12,617,618 B2
(45) Date of Patent:  May 5, 2026

(54) AUTOMATIC WAREHOUSE AND A METHOD FOR MANAGING AN AUTOMATIC WAREHOUSE BASED ON POPULARITY OF ITEMS

(71) Applicant: Caja Elastic Dynamic Solutions Ltd., Binyamina (IL)

(72) Inventors: Reuven Della Torre, Ramat Gan (IL); Henri Garih, Binyamina (IL)

(73) Assignee: FIL ROBOTICS LTD, Binyamina (IL)

( * ) Notice: Subject to any disclaimer, the term of this patent is extended or adjusted under 35 U.S.C. 154(b) by 584 days.

(21) Appl. No.: 18/022,419

(22) PCT Filed: Aug. 23, 2021

(86) PCT No.: PCT/IB2021/057706
§ 371 (c)(1),
(2) Date: Feb. 21, 2023

(87) PCT Pub. No.: WO2022/038579
PCT Pub. Date: Feb. 24, 2022

(65) Prior Publication Data
US 2023/0331488 A1      Oct. 19, 2023

Related U.S. Application Data

(60) Provisional application No. 63/068,930, filed on Aug. 21, 2020.

(51) Int. Cl.
B65G 1/137 (2006.01)
B65G 1/04 (2006.01)
G06Q 10/087 (2023.01)
(52) U.S. Cl.
CPC ......... B65G 1/1378 (2013.01); B65G 1/0492 (2013.01); G06Q 10/087 (2013.01)

(58) Field of Classification Search
CPC .. B65G 1/1378; B65G 1/0492; B65G 1/1371; G06Q 10/087; G06Q 10/08
See application file for complete search history.

(56) References Cited

U.S. PATENT DOCUMENTS 10,503,143 B1    12/2019  Polic
11,086,336 B1 *   8/2021  Bolotski .............. G05D 1/0212
(Continued)

FOREIGN PATENT DOCUMENTS

CN        108750521  A      11/2018
CN        109250380  A  *   1/2019   ........... B65G 1/1373
(Continued)

OTHER PUBLICATIONS

International Search Report and Written Opinion for PCT Patent App. No. PCT/IB2021/057706 (Dec. 2, 2021).

*Primary Examiner* — Jacob S. Scott
*Assistant Examiner* — Miraj T. Patel
(74) *Attorney, Agent, or Firm* — KENEALY VAIDYA LLP

(57) ABSTRACT

An automated warehouse that may include a storage configured to store multiple items, wherein the multiple items are stored in item containers; a plurality of picking stations that comprise an asynchronous picking station and a synchronous picking station; one or more robots that are configured to convey item containers to the plurality of picking stations; and at least one computerized system configured to control the conveying of the item containers based on a popularity of items included in the item containers.

18 Claims, 7 Drawing Sheets

(56)                    References Cited

U.S. PATENT DOCUMENTS

| | | |
|---|---|---|
| 2014/0052498 A1 | 2/2014 | Marshall et al. |
| 2014/0236343 A1 | 8/2014 | Hill et al. |
| 2017/0193434 A1 | 7/2017 | Shah et al. |
| 2018/0122032 A1 | 5/2018 | Asaria et al. |
| 2019/0266552 A1 | 8/2019 | Gupta et al. |
| 2020/0039747 A1 | 2/2020 | Ahmann et al. |
| 2022/0144546 A1 | 5/2022 | Tendo et al. |

FOREIGN PATENT DOCUMENTS

| | | | |
|---|---|---|---|
| EP | 0302205 | A2 | 2/1989 |
| EP | 1761444 | B1 | 9/2007 |
| EP | 3180275 | B1 | 12/2017 |
| JP | H1120914 | A | 1/1999 |
| JP | 2018090347 | A | 6/2018 |
| JP | 2019502613 | A | 1/2019 |
| JP | 2019077549 | A | 5/2019 |
| JP | 6661181 | B1 | 3/2020 |
| JP | 2020125191 | A | 8/2020 |
| WO | 2017216127 | A1 | 12/2017 |
| WO | 2019123254 | A1 | 6/2019 |

* cited by examiner

100

AUTOMATIC WAREHOUSE AND A METHOD FOR MANAGING AN AUTOMATIC WAREHOUSE BASED ON POPULARITY OF ITEMS

CROSS REFERENCE TO RELATED APPLICATIONS

This application is a national phase filing under 35 U.S.C. § 371 of and claims priority to PCT Patent Application No. PCT/IB2021/057706, filed on Aug. 23, 2021, which claims priority benefit under 35. U.S.C. § 119 of U.S. Patent Application No. 63/068,930, filed on Aug. 21, 2020, the contents of each of which are hereby incorporated in their entireties by reference.

BACKGROUND

Order fulfilment of orders placed over the Internet must take place within a relatively short period of time in order to be commercially competitive.

The same could be said for orders received by phone, facsimile or by the mail based on catalogue or television-based merchandizing. Such order fulfilment is known as E-commerce and places demands on an order fulfilment system to meet such obligations. This is compounded by the fact that E-commerce usually involves a large number of small orders (each containing as few as one item in the order) that are selected from a large number of potential items.

Each unique item has a specific inventory identification, known in the industry as a stock-keeping unit (SKU). Each item usually bears an optical code, such as a barcode or radio frequency identification (RFID) tag that identifies the SKU of the item.

A picking stations in automated warehouses work in a way that the box arrives (by a robot) from storage to a particular station, the picker (human or robotic), picks from said box one or several items and places the items in a put wall so that packers can packages the one or more items to provide one or more packages that are outputted from the automated warehouse. The box awaits till the picker picks the one or several items and then immediately return the box to the storage.

This kind of picking stations requires the robot and the picker to be synchronized—as the robot provides the currently requested one or several items—each time that item (or several items) are required.

However, when a box includes a highly popular item (also referred to as a high runner), and the box that includes the highly popular item is brought to the picking station multiple times—which is inefficient.

There is a need to provide an efficient method for managing the supply of highly popular items.

SUMMARY

There may be provide an automated warehouse and/or a method one or more and/or non-transitory computer readable medium as illustrated in the application.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

DETAILED DESCRIPTION OF THE DRAWINGS

Figure 1:
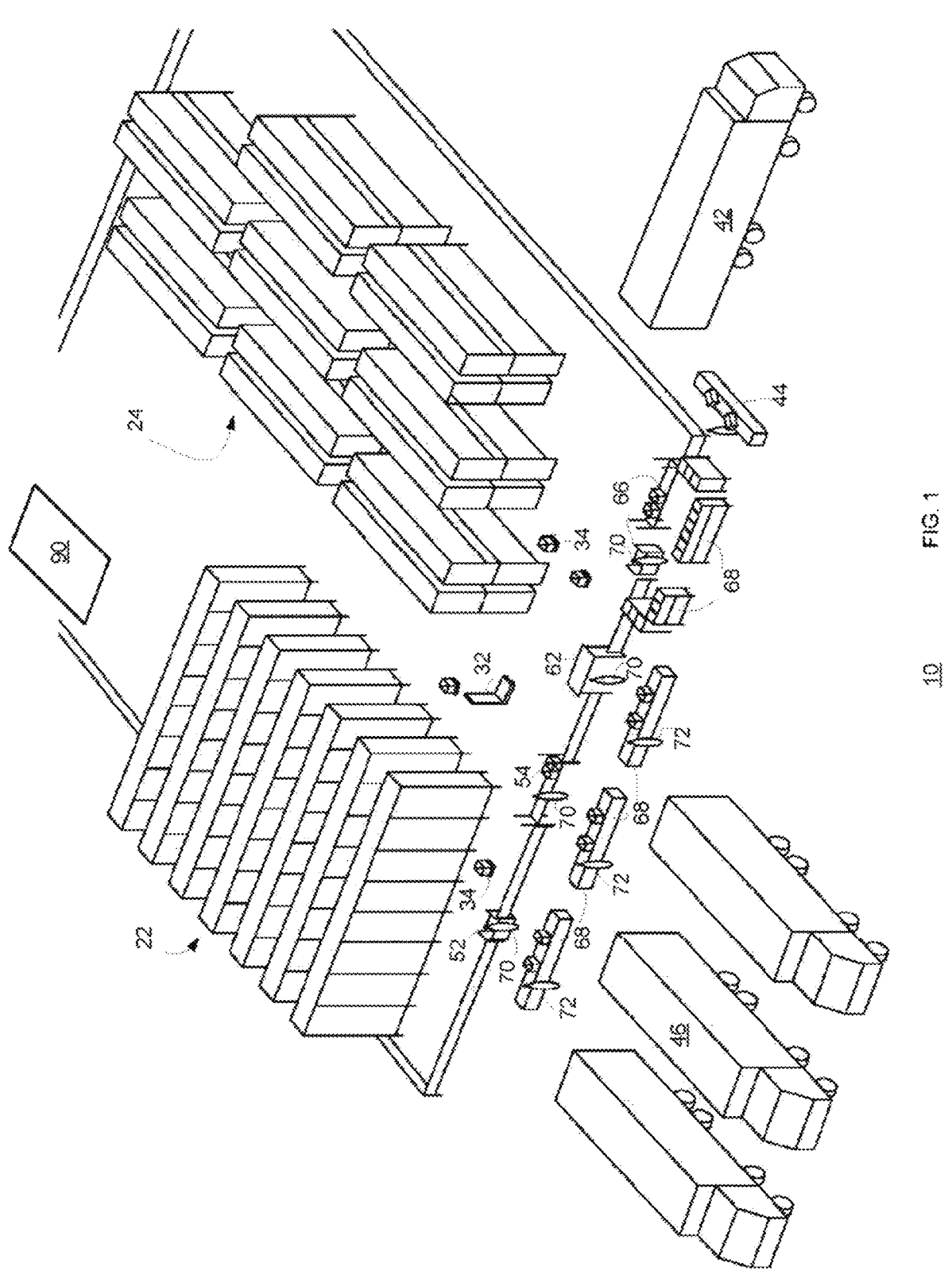
FIGS. 1 and 2 illustrates examples of an automated warehouse.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. A computerized system may include one or more processors and may also include additional units or components such as memory units, communication units and the like.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The following description is provided, alongside all chapters of the present invention, so as to enable any person skilled in the art to make use of said invention and sets forth the best modes contemplated by the inventor of carrying out this invention.

Various modifications, however, will remain apparent to those skilled in the art, since the generic principles of the present invention have been defined specifically to provide a means and method for delivering goods to persons.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled.

Reference throughout this specification to "one embodiment" or "an embodiment" means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer (e.g. 1, 5, or 10).

A popular item is also referred to as high runner. A popularity of an item may be determined during a period of time. The period of time may have a duration determined in any manner—for example—by an automated warehouser operator, by an automated warehouser manager, by an automated warehouser operator customer, by an automated warehouse control system, and the like. Example of such a period may include one or more hour, one or more days, one or more weeks, one or more months, and the like.

An item may be regarded as popular in comparison to a threshold of invitations per period of time, to a threshold of supplies per a period of time, and the like. An item may be regarded as popular based on a comparison to a popularity of other items. For example—the X most popular items may be regarded popular, X may be set in any manner—may be fixed, may change over time and the like.

The following text may refer to a box that may store one or more items. A box is a nonlimiting example of an item container. The item container may differ from a box. The term "box" is used for simplicity of explanation.

The following text may refer to a shell that may support one or more boxes. A shelf is a non-limiting example of an item container support element. The item container support element may differ from a shelf. The term "shelf" is used for simplicity of explanation.

There may be provided an asynchronized picking station, that will be refer as a Async picking station. An asynchronous picking station may include a small storage area that the picker can access. The robots deliver boxes to that storage area for the picker to pick and fulfil the picking station's orders. Once the automated warehouse system detects that a box was fully used for all the relevant orders of the picking station it will instruct a robot to come and take back the box from the picking station storage area to the main warehouse storage area.

The automated warehouse includes a storage for storing multiple boxes. A storage may include one or more storage units. A storage unit may include one or multiple item container support elements, may be arranged in columns, in rows, in isles, as a matrix, in an ordered manner or an unordered manner.

There is provided an automated warehouse that has one or more asynchronous picking stations and a method and/or a non-transitory computer readable medium for managing an automated warehouse.

The automated warehouse is configured to manage items based on their popularity—and allocate resourced dedicated to popular items. The resources may include one or more asynchronous picking stations.

There is provided an order fulfilment method and a system for carrying out such method and, in particular, to such method and system that is useful for processing a large number of orders (that include popular items) in a relatively short period of time.

The method may be applied by an automated warehouse. The automated warehouse may be configured to provide goods to one or more picking stations through forklifts or automated carts that can put and retrieve boxes from and to the shelving.

The automated warehouse may include one or more picking stations that are asynchronous in the sense that they may store boxes even when an item of the box is not currently ordered.

The automated warehouse may be configured to present a box to an asynchronous picking station—for example place on a shelf or any other support/receiving part of the asynchronous picking station, whereas the box may remain in the asynchronous picking station even when an item stored in the box is not currently destined to be packaged.

The picker may access one or more boxes within the asynchronous picking station multiple times without having the box travel between the asynchronous picking station and the storage.

On order to receive a certain item may be fulfilled by a picker by accessing a box that is located in the asynchronous picking station and retrieving the certain item—assuming that the certain item is a popular item.

Once the item is deemed unpopular—or when more popular items need to be provided to the asynchronous picking station—the box including the item may be evacuated from the asynchronous picking station. If the item and more popular items may populate the asynchronous picking station—then the item may be maintained in the asynchronous picking station.

The picker may pick the item from the robot (when the robot first accesses the asynchronous picking station with the item). Alternatively, the picker may wait till the box with the item is placed in the asynchronous picking station.

There may be provided a buffering type synchronous picking station that may provide a short-term delay period (may be shorter that the storage period provided by an asynchronous picking station). The buffering type synchronous picking station may include an input for receiving a box from a robot, and may output the box to an output— whereas the box may be taken from the output by the same robot (that inputted the box) or another robot.

The delay may be determined by a picker—that picks one or more items from the one short-term delayed box to another—whereas a box that had one or more items picked from—may be sent to the output. The picker may control the outputting or may provide an indication that he picked one or more items of the box—making that box eligible to be outputted.

The buffering type synchronous picking station may include a conveyor that may hold multiple boxes at a time. A first robot may provide the box to an input the conveyor on one side, whereas the conveyor may be ready to be picked by the first robot or even a second robot. The conveyor may be motorized or not. This may prevent a scenario of having multiple robots wait (usually positioned one after the other) till the picker takes one or more items from a first box— which results in a waste of time.

For example—if the short-term delay is about a few minutes—the robots do not need to wait for a low minutes before returning to the storage.

The WCS may be configured to preliminary partially fill a buffering type synchronous picking station—before a picker arrives—with items of multiple orders.

The automated warehouse may include one or more asynchronous picking stations. The asynchronous picking stations may be of the same shape, size, capacity of boxes. Alternatively, at least one asynchronous picking station may differ from another asynchronous picking station by at least one of shape, size or capacity of boxes.

The items of the automated warehouser operator may require the same type of storage—but there may be items of different types that may require different types of storage. For example—some items must be stored in a controller environment (in which at least one environmental condition is maintained within a certain range—for example temperature range, humidity range, light range, and the like).

Items of different types may be managed differently. Resources (storage resources and/or picking stations and/or asynchronous picking stations and/or synchronous picking stations and/or parts of picking stations and/or parts of asynchronous picking stations and/or parts of synchronous picking stations) may be allocated per items of different types.

An automated warehouse may be managed by an automated warehouse control system (WCS). The WCS may be executed by any type of computers—one or more servers, one or more computers, may be operated in a centralized or distributed manner. The WCR may include WCS parts that may manage different parts of the automated storage.

The WCS may include a Warehouse Management System (WMS), may be included in a WMS or may cooperate with the WMS. For simplicity is it assumed that the WCS has WMS capabilities—thus it may perform automated warehouse control and management operations.

The WCS may obtain (receive and/or generate) information relevant to the management of the automated warehouse. Thus may include at least one out of orders, received items, availability of trucks or any other output entities to output items from the automated warehouse, content of boxes (items stored per box and/or quantity of items per box), a mapping between item identifiers (SKU, barcodes and the like) and items, locations of items (storage, picking stations), any information regarding an item (including item type, expiration period, storage parameter, conveying parameter, fragility, position of conveying, and the like), packaged boxes, content of picking stations, historical data (including history of orders), popularity information, environmental information, and the like.

The WCS may be fed from sensors and/or any tracking systems and/or robots and/or pickers about the locations of the boxes and the content of the boxes (including for example the amount of one or more items per box). Sensors may be of any type—including visual sensors, cameras, RFID readers. NFC readers, and the like.

The WCS is configured to manage the storage and/or provision process of the items. A provision process may include at least one out of picking a box (including the item), providing the box to a picking station, returning the box to the storage, managing the storage, performing the picking and the like. When the picking is managed by a human then the WCS may provide suggestions regarding the picking.

For example—the WCS may add received items to an overall inventory, allocated boxes for items, may fill or partially fill boxes by items, may add boxes to a box inventory, and the like.

The WCS may be configured to determine locations of boxes within the storage—for example by taking into account the distance to one or more picking stations and/or by taking into account the popularity of the items.

Popular items may be located closer to an asynchronous system.

Popular items may be located in a manner that will reduce a chance of a formation of a bottleneck of robots that may concurrently fetch boxes with popular items—by providing at least a certain spacing between adjacent popular items.

Popular items may be located at the same height—in order to speed up their retrieval—especially when some robots are dedicated to obtaining popular items- and this may save these robots from adjusting the height of their forks (or equivalent interfaces) between a picking of one popular item after the other.

The WCR may perform load balancing between asynchronous picking stations and/or allocate picking stations to items—and may determine the locations of the popular items based on the locations of the allocated asynchronous picking stations.

The locations of the popular items may be set based on the locations of non-popular items and other popular items.

The WCS may determine locations by applying any process that may increase the effectiveness of the provision of items (especially popular items), and/or reduce delays in the provision of items and/or increase throughput of the automated warehouse.

The WCS may determine a location of a popular item in the storage, the one or more robots that convey the item to the picking station and the returning of an item to the storage while taking into account all of some of these considerations (location may be based on the allocated asynchronous picking station, the allocated asynchronous picking station may be determined based on the popularity of the item and load balancing or other considerations), and the like.

The WCS may change the allocation of asynchronous picking station per item over time.

The WCR may control the provision of an item from the storage of an allocated picking station (asynchronous or synchronous), and the return of the box to the storage.

The WCS may request a robot to retrieve a box from its current location and deliver it to a certain picking station. The WCR may instruct a robot to move a box from one picking station to another.

The WCS may be configured to obtain orders (for items) to be fulfilled. The orders may be obtained one after the other or in batches.

An order may include an item identifier and one or more order related parameters. An order related parameter may include a due date for supplying the item and quantity.

The WCS is configured to prioritize the orders—for example based on one or more prioritizing parameters including a due date, a popularity, item type, and the like.

For example—the WCS may separately control the provision of items of different types.

It is assumed, for simplicity of explanation, that there are two types of items—cold items (should be maintained in a low temperature) and hot items (may be stored in room temperature).

The WCS may split the orders of cold items from orders of hot items.

The WCS may manage orders of different types (of each type—hot and cold) separately.

The WCS then manages the provision of items to the picking station in an efficient manner.

The WCS may be configured to communicate with robots and/or picking stations in any manner using any type of communications. For example the WCS may be executed by one or more computerized systems that may communicate using any communication means (usually wireless communication) with robots and/or sensors and/or picking stations and/or pickers.

The WCS may be configured to control the allocations of items per box and the provision of items so that a same picking station may receive at the same time items that may serve more than a single order line.

A batch factor is a number of order lines supplied by a single box that has been brought to a picking station. The batch factor obtained by efficiently having more than a single item per box may exceed one. The WCS may obtain order history information and figure out which items are concurrently purchased (either at the same order or during a certain time window or a few minutes or other short duration) and allocate items to boxes based on their concurrency.

A batch factor that ranges between 0 to 1 may be obtained when received order lines have with greater quantity of items than the usual amount of item in a box—for example—when there is a store replenishment. The batch factor is exactly 1 when the system brings one box for each order line.

The more the batch factor is above 1, the more optimized the orders at the picking station. The suggested method may obtain batch factors of 1.5 to 2 in certain areas of interest (for example in pharma), and up to 4 (for example in grocery).

The first outcome from the above is that one picking station should offer the possibility of fulfilling several orders at the same time. This is called "pick by order" in a "put wall". The meaning of the latter is that the picking station is equipped with a put wall that is made of several locations, each order gets assigned to a specific location in the put wall. Then, the picker, when he picks items from a box, puts it in the right location to fulfil a specific order line of the concerned order.

Usually, these put walls are equipped with a system of "put to light" that lights up the right location for the picker to put the item in. The put to light may be implemented by having a display and a button that is fixed under every location. When the location is concerned by the current picking, the display will light up, then, when the picker actually puts the items in, he/she will press the button.

The WCS may controls the put in light area of a picking station one, by activating the light source and/or may receive an indication that the light source was activated to light a certain item and/or may receive an indication from the picker that the picker positioned the right the item in the right location. There may be no theoretical limit to the number of locations in the put wall. However—the more locations in the put wall the bigger footprint the put wall will take up. Then, the picker will have to walk more distance to provide certain orders which will increase the mean pick time and reduce the picker efficiency.

Accordingly—the size of the put wall and accordingly the number of items that may be placed in the put wall may be determined based on the duration required to obtain the item (larger put wall increase that time) and the batch factor (may require to increase the put wall).

Thus—there may be provided a trade-off regarding the number of locations in the put wall because the more locations in the put wall, the more the batch factor increases. On the other side, the more location in the put wall the less efficiency of the picker. The second optimization comes from the triage between the different types of picking station.

Certain box can serve several orders while other boxes may serve a single order.

The time the picker will spend on a box could attain several dozen seconds up to minutes.

The asynchronous picking station may be efficient when the picker needs to pick from the box a high number of items, either to one or more orders that are collected in the picking station at the specific time. The reason is that it takes a substantial amount of time to collect a numerous quantity of items from a box, as explained above, the pick time could take up to a minute or more.

In a synchronous regular picking station, the robot has to wait for the picker to finish the picking process. In addition, all the robots that are waiting in the picking station will wait as well. When using an asynchronous picking station, the robots doesn't have to wait for the picker to pick all the items from the container as it leaves the container in the picking station and continue with its next task.

Moreover, concerning certain items, usually the items in sale or very popular, the put wall size might not be able to contain every order that contain this specific item. Then, with asynchronous picking station, the box with this item can stay in this picking station to wait for other orders to be assigned to this particular picking station.

A box of items in sale, usually stays in the asynchronous picking station until the box is emptied, then it even doesn't need to be taken back to storage.

The WCS may take into account the demand on each SKU and the frequency of the demand. The WCS may also take into account prevision based on past events and future events such as, but not limited to, sales, weather and time of year to calculate the demand on each SKU.

Moreover, the WCS may specify that certain items are for sale and the duration of this sale so that the WCS will consider those items as high runners.

Then, the WCS may determine which items are 'high runners' and make them available to the picker on the asynchronous picking station.

For example, an item may be considered a high runner, and thus will be presented on the asynchronous picking station, when the item is expected to be a high runner—for example—events (order triggering events) such a rain and/or snow can accelerate the sales of umbrellas and/or raincoats and/or boots. More example of order triggering events include—the beginning of summer may accelerate the sales of bathing suits and/or sunscreens and/or sun glasses. Order triggering events that are associated with certain types of food products may accelerate the sales of such food and/or items for cooking such foods (turkeys before thanksgiving, grills and/or barbeque equipment at the beginning of spring, additional example of order triggering events are holidays— Christmas ornament every Decembers or flowers on Valentine's day or costumes before Halloween.

The WCS may be configured to learn the trends in demand on specific items based on the past, e.g. an item is demanded every Friday, every $1^{st}$ of the month, every Christmas . . . .

The WCS may manage the asynchronous picking station to store the most popular items—even when it may require evacuating one or more less popular item from the asynchronous picking station—especially when there is not enough space to store more popular items.

The WCS may be configured to decide which item to move out of the asynchronous picking station based on prevision of which item will have the less demand in the foreseeable future, i.e. the orders that need to be fulfilled until the end of that day.

This triage of goods between high runners and less popular items (low runners) may be executed constantly of in intervals—whereas the intervals may be frequency enough (for example—each one or more minutes, each one or more hour, several times a day).

The WCS, based on information explained above, can be configured to control as sending said high runners to the asynchronous picking station and a sending of low runners to synchronous picking station. The latter is the classical picking station where the robot presents the bin to the picker and waits for the picker to pick the needed items from the box that is on the robot.

This triage may also take into account the load on the different stations, in other words, the threshold between low and high runner is adapted automatically to balance the load between the different picking stations.

The asynchronous picking station has also the advantage of freeing the robot from queue and waiting for the picker to pick, it allows the different robots to perform other tasks while the picker is picking the goods from the boxes.

On the other hand, traditional picking station (synchronous picking station) binds the robot to stay in line waiting for its turn and then waiting for the picker to pick from the box that is on the robot.

A picker may be allocated with more than a single picking station—a mix of one or more asynchronous picking station and a mix or synchronous picking station.

The mix may be very useful when the same order contains a low and fast runner item. Thus, the orders can be fulfilled by the same picker for items of different popularity levels— freeing the process of the consolidation part of said process that is needed when an order is fulfilled in different places.

The type of a picking station can be changed at all times if the profile of the typical orders or items in warehouse changes.

This change may include replacing synchronous picking station by an asynchronous picking station.

When a synchronous picking station differs from an asynchronous picking station—this replacement may be time consuming—for example may take between a few minutes to a few hours and even more.

On the other hand—when the different between said stations is not in their hardware—but rather in the manner they are maintain boxes—the replacement can be done in virtually no time.

When the replacement is time consuming—it may be used only when the replacement is worth a while—and the benefit obtained from the replacement exceeds the downfall of deactivating a station. For example—the benefit of exchanging can increase in peak times—such as black Friday, cyber-Monday or Christmas, i.e. the months of November and December.

It is also applicable to combine the two types of picking stations in a way that the WCS will instruct a robots either to place the box in the picking station area (async part) or to hand it to the picker in a synchronous way.

Usually, to accommodate a peak period, the picking stations are transformed to asynchronous ones that better serves this momentary period operations, afterwards, the picking stations may be changed back into synchronous picking stations or hybrid picking stations.

The WCS may be able to control a preliminary filling of one or more picking stations—for example perform the prefilling before a shift starts—by putting boxes needed for the first orders in the asynchronous picking station and/or on the buffering type synchronous picking station.

The WCS may be configured to control an organization of the items in the storage—for example by putting the 'high runners' boxes in the right places in order to diminish the time needed to bring it to the picking stations.

The preliminary filling of picking stations and/or the rearrangement of items in the storage (allocation of items per box and/or rearrangement of boxes in storage) can be done by activating the WCS some time (for example a few minutes till a few hours) before the start of the shift. The WCS may be activated by an operator but may be activated by itself or other means.

During this pre-shift period (in which the WCS operated before the shift)—the WCS may already have or may obtain orders for at least for the beginning of the shift—and thus (based on said orders and other information such as historic data and/or weather forecast and/or any relevant information) may be able to predict the expected demand for items during at least the beginning of the shift.

The WCS can request robots of the automated warehouse to prepare the warehouse by positioning the relevant items (for example expected hot runners for the shift) in relevant locations in the storage (for example near allocated picking stations), and at least partially fill one or more asynchronous stations, and/or buffering type synchronous picking station.

The inventors have found that this pre-shift operations may increase the throughput of the automated warehouse— for example even by up to 30 percent.

The WCS may be configured to self-organize the 'high runners' boxes not to be close to one another in order to decrease the load on certain aisles of the warehouse. Indeed, the WCS as stated below, when optimizing the warehouse to bring highly demanded boxes near the picking stations may take into account the traffic jams that would occur if robots needed to take from the same aisle several boxes at the same time.

Thus, the optimization of the warehouse may include dispersing needed boxes to several aisles to decrease the foreseeable traffic congestions.

An asynchronous picking station may include one or more shelves dedicated to store boxes that include one or more high runners.

A picking station may be of adjustable height and/or location of boxes/shelfs thereby allowing the adjust the storage to pickers of different heights and/or disabilities.

The system may include safety mechanisms to ensure human safety.

The WCS may determine the locations of boxes in a picking station in manner that will optimizing the provision of popular items to pickers.

The method may include interacting between human and the box or its content.

Figure 2:
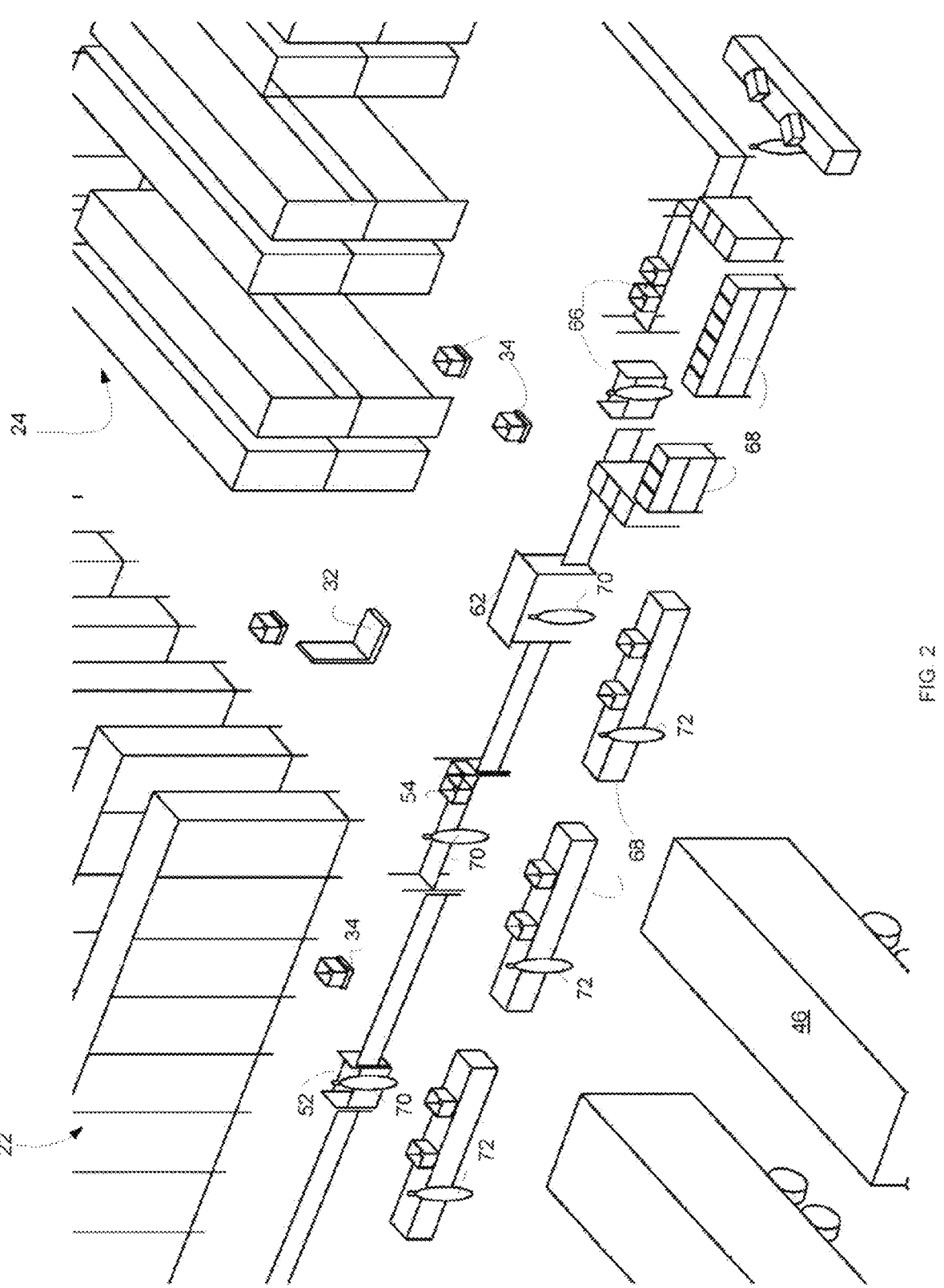

FIGS. 1 and 2 illustrate examples of an automated warehouse 10. The automated warehouse 10 is illustrated as including (regular) storage 22, cold storage 24, robots such as lift robot 32, cart robots 34, returns unit 42, an asynchronous picking station 52, a synchronous picking station 54, cold asynchronous picking station 62, hybrid picking station 66, and put-wall 68. Pickers 70 pick items from the picking stations and place them in put walls. Packers 72 take items from the put-wall 68 and pack them. FIG. 1 also illustrates inbound truck 42 and outbound trucks 46.

Figure 6:
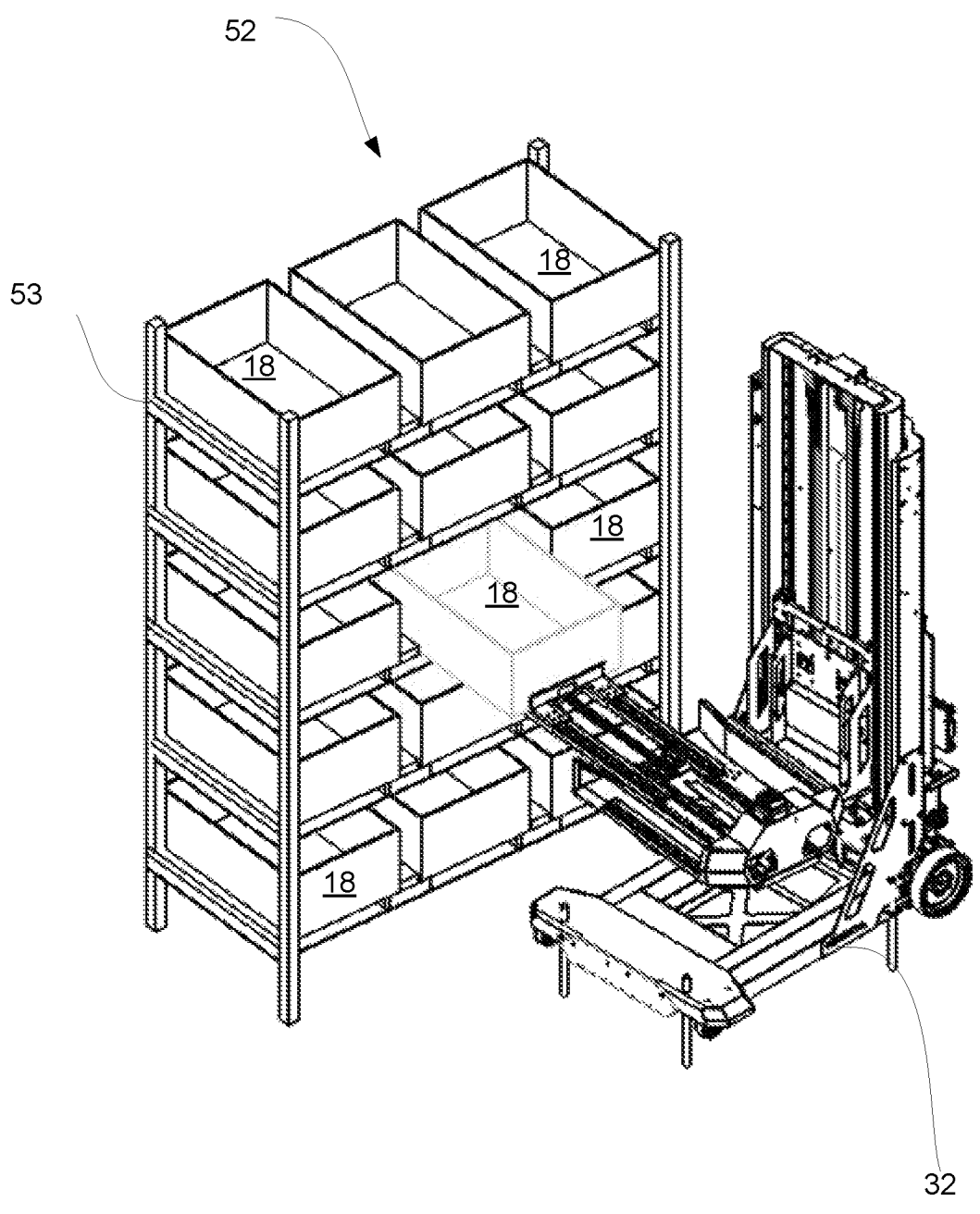
FIG. 6 illustrates asynchronous picking station.

The number and/or type of robots may differ from those illustrated in FIGS. 1, 2 and 6, the picking station may differ from those illustrated in FIGS. 1, 2 and/or may be of any type, the types of picking stations may differ from those illustrated in FIGS. 1, 2 and may be of any type (synchronous, asynchronous, hybrid, buffer type synchronous), the types of storage may differ from those illustrated in FIGS. 1, 2 and may be of any type (an automated warehouse may include only one type of storage, or more than two types of storage (and picking stations accordingly)—for example only cold, only normal, or any combination of any type of storage).

Figure 3:
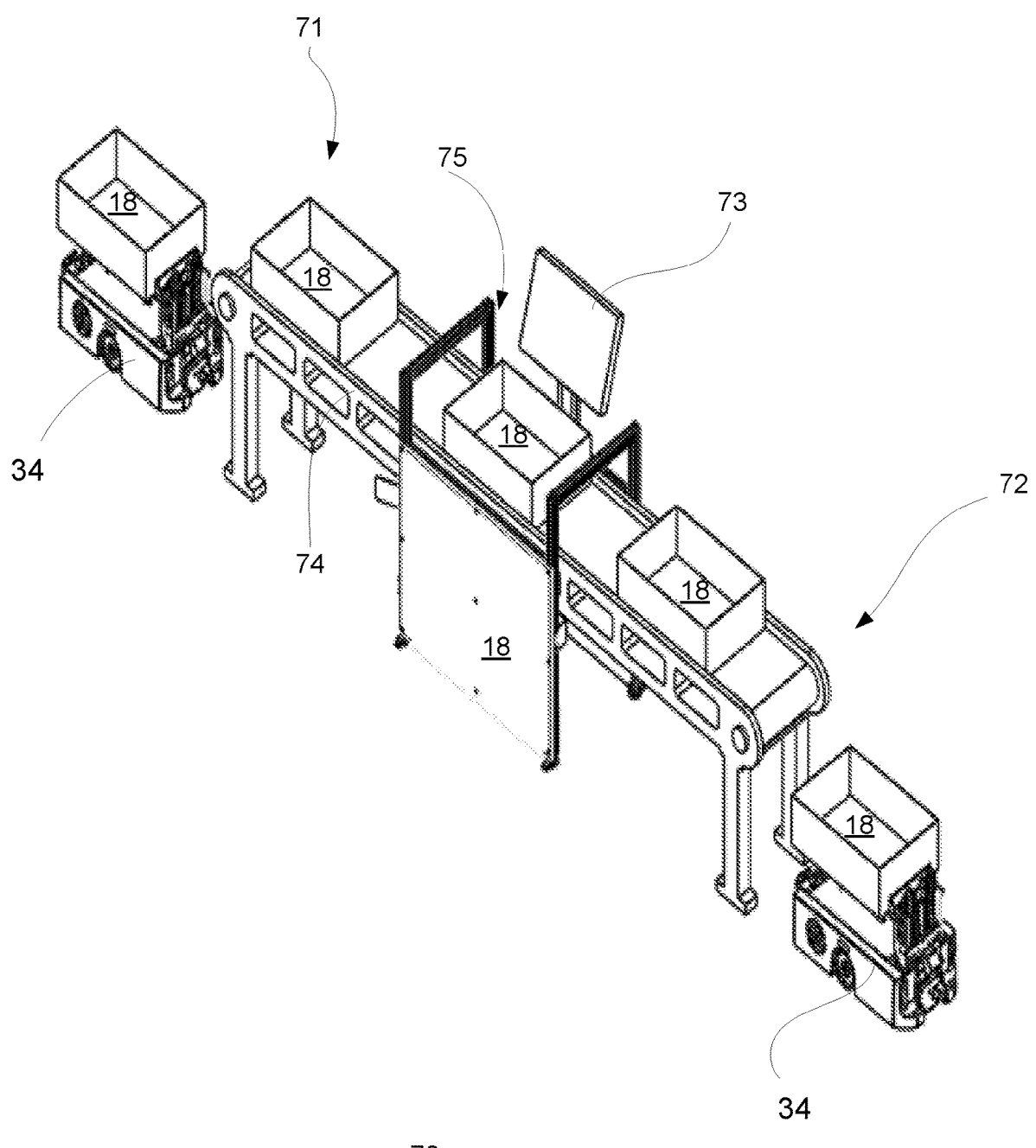
FIG. 3 illustrates an example of a buffering type synchronous picking station.

FIG. 3 illustrates an example of a buffering type synchronous picking station 70 that includes input 71, output 72, conveyor 74, computerized system 73 for interacting with a picker (not shown) to indicate which items are taken from the box 18). The picker can easily access region 75 that can be selectively illuminated by a light source (not shown). FIG. 3 also illustrates cart robots 34 at the input and the output.

Figure 4:
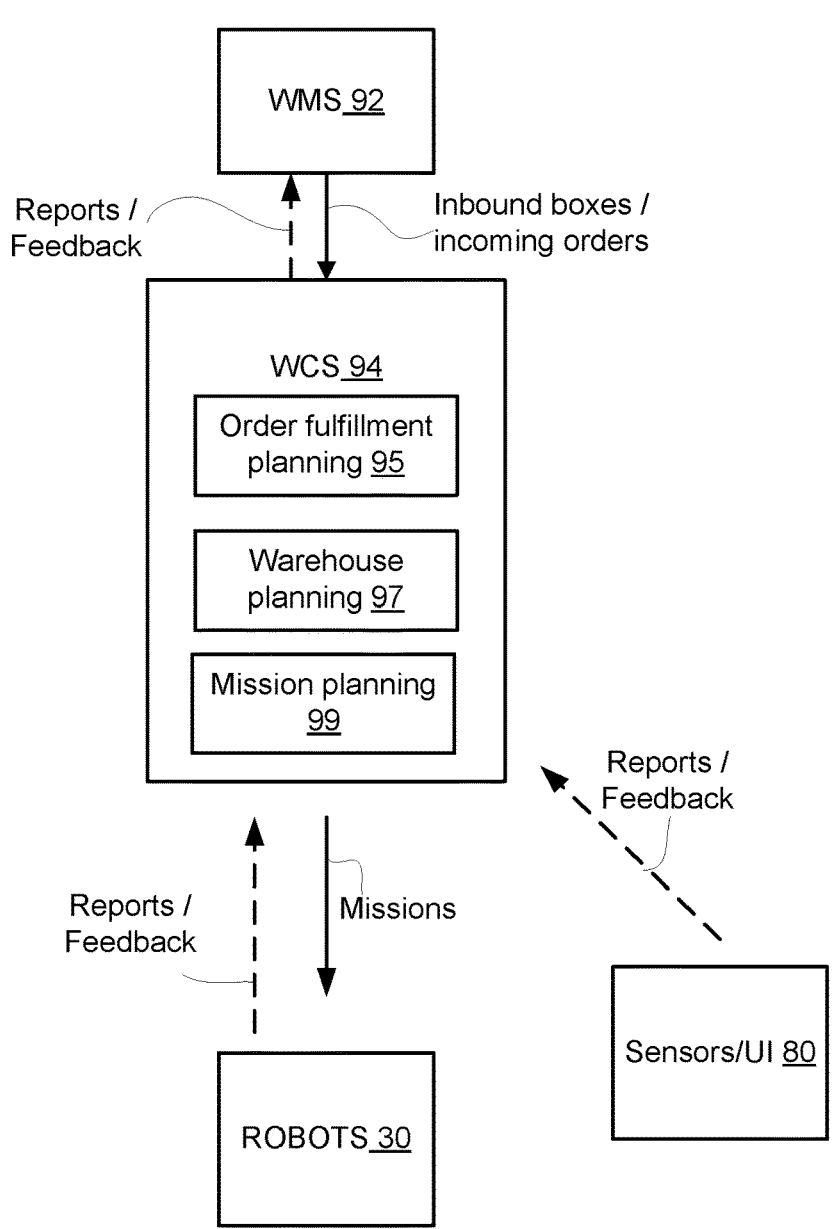
FIG. 4 illustrates an example of a flow of information.

FIG. 4 illustrates an example of a flow of information.

FIG. 4 illustrates WCS 94, WMS 92, robots 30 and sensors/UI 80. UI are user interfaces that may be fed by pickers and/or packers. The WCS may execute tasks such as order fulfilment planning 95, warehouse planning 97, and mission planning 99. Robots 30 may receive missions from WCS and provide reports/feedback (for example completion of mission, faults, and the like). Sensors and/or UI may provide reports and/or feedback and/or requests to WCS and may get information, responses and the like. WMS 92 and WCS 94 may exchange reports/feedback, inbound boxes information, incoming information and the like. As indicated above—WMS and WCS may be executed at least one computerized system and/or WCS may have WMS functionality or include WMS.

Figure 5:
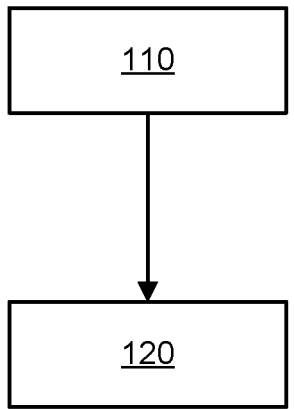
FIG. 5 illustrates an example of a method.

FIG. 5 illustrates an example of a method 100.

Method 100 is for managing a provision of items within an automated warehouse. Method 100 may start by step 110 of obtaining, by at least one computerized system, information regarding items to be outputted from the automated warehouse.

The information may include, for example information about order triggering events, history of purchased, items that were purchased together, popularity of items, orders, received items, availability of trucks or any other output entities to output items from the automated warehouse, content of boxes (items stored per box and/or quantity of items per box), a mapping between item identifiers (SKU, barcodes and the like) and items, locations of items (storage, picking stations), any information regarding an item (including item type, expiration period, storage parameter, conveying parameter, fragility, position of conveying, and the like), packaged boxes, content of picking stations, historical data (including history of orders), popularity information, environmental information, and the like. The information may be provided by sensors and/or any tracking systems and/or robots and/or pickers about the locations of the boxes and the content of the boxes (including for example the amount of one or more items per box). Sensors may be of any type—including visual sensors, cameras, RFID readers, NFC readers, and the like.

Step 110 may be followed by step 120 of controlling, based on the information, a provision, by one or more robots of item containers to a plurality of picking stations of the automated warehouse, based on a popularity of items included in the item containers; wherein the plurality of picking stations may include an asynchronous picking station and a synchronous picking station.

Step 110 of obtaining information may continue during step 120. There may be provided multiple iterations of steps 110 and 120. The information may also be obtained during the execution of step 120.

Step 120 may include at least one out of:
(a) controlling a provision of the item containers from the plurality of picking stations;
(b) controlling a conveying of items of a first popularity range to the asynchronous picking station;
(c) controlling a conveying of items of a second popularity range to the synchronous picking station, wherein a first popularity range may include popularity levels that may be higher than popularity levels of the second popularity range;
(d) controlling an evacuation of item containers from the plurality of picking stations based on the popularity of the items included in the item containers;
(e) controlling a duration of stay of the item containers in the plurality of picking stations so that an item container provided to the asynchronous picking station stays in the asynchronous picking station for a duration that well exceeds a duration of stay of another item container stored in the synchronous picking station;
(f) enabling a stay of an item container that stores a popular item within the asynchronous picking station even during a gap in orders for the item;
(g) controlling a provision and an evacuation of popular items based on orders per a certain period of time that has a duration equivalent of a duration of fulfillment of multiple orders by the picking station;
(h) controlling a provision and evacuation of an unpopular item based on an order for the unpopular item;
(i) controlling storage locations of popular items;
(j) controlling an initial storage of at least the asynchronous picking station before a start of a shift;
(k) determining a popularity of items based on at least one out of open orders, and one or more order triggering events;
(l) determining an allocation of items per one or more item container;
(m) determining an allocation of concurrently ordered items per item container;
(n) controlling the conveying of boxes to picking stations that may include different picking stations for different types of items, (o) independently controlling a provision of items of different types to different picking stations, (p) controlling provision of boxes to a buffering type synchronous picking station.

(q) independently controlling a first robot to provide a container to an input of the buffering type synchronous picking station and to take the item conveyor, from an output of the buffering type synchronous picking station;

(r) controlling one or more robots to convey item containers from the plurality of picking stations.

FIG. 6 illustrates asynchronous picking station 52 that stored boxes 18 using a multi-shelf frame 53. Lift robot 32 is shown as picking a box. For simplicity of explanation all boxes are illustrated as being empty—although they include one or more items.

Figure 7:
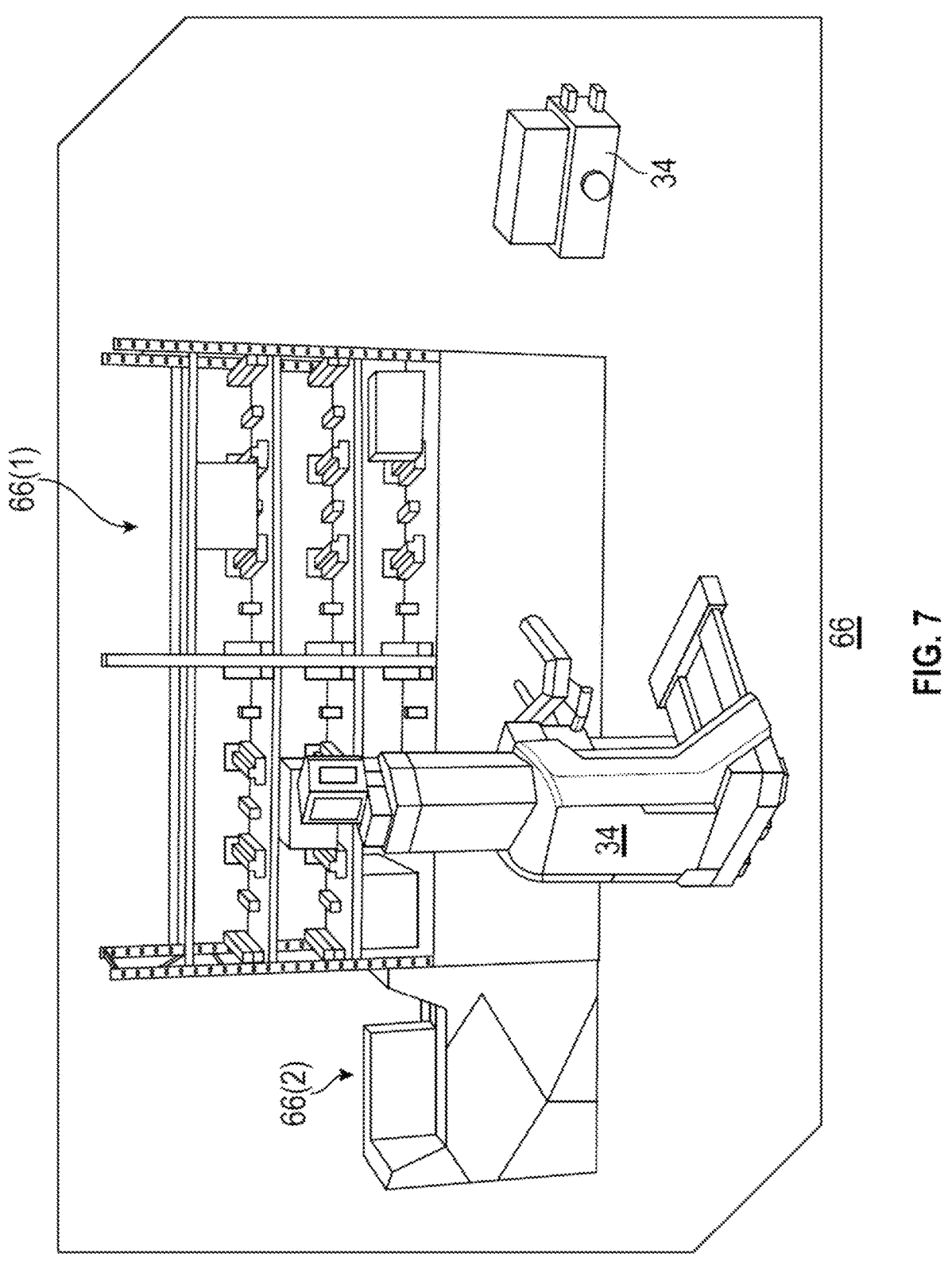
FIG. 7 illustrates an example of a hybrid picking station.

FIG. 7 illustrates a hybrid picking station that may include an asynchronous picking station portion 66(1) and a synchronous picking station portion 66(2). FIG. 2 also illustrates lift robot 34 and tray robot 32. Any other types of robots may be provided.

Any picking station may include means for supporting boxes—for example shelves, drawers, and the like.

There may be provided at least one non-transitory computer readable medium for managing a provision of items within an automated warehouse, the non-transitory computer readable medium stores instructions for obtaining, by at least one computerized system, information regarding items to be outputted from the automated warehouse; and controlling, based on the information, a provision, by one or more robots, of item containers to a plurality of picking stations of the automated warehouse, based on a popularity of items included in the item containers; wherein the plurality of picking stations may include an asynchronous picking station and a synchronous picking station.

There may be provided an automated warehouse that may include a storage configured to store multiple items, wherein the multiple items may be stored in item containers; a plurality of picking stations that may include a hybrid picking station that may include an asynchronous picking station portion and a synchronous picking station portion; one or more robots that may be configured to convey item containers to the picking station; and at least one computerized system configured to control the conveying of the item containers based on a popularity of items included in the item containers.

There may be provided an automated warehouse that may include a storage configured to store multiple items, wherein the multiple items may be stored in item containers; a plurality of picking stations that may include an asynchronous picking station portion and a buffering type synchronous picking station; one or more robots that may be configured to convey item containers to the picking station; and at least one computerized system configured to control the conveying of the item containers.

There may be provided an automated warehouse that may include a storage configured to store multiple items, wherein the multiple items may be stored in item containers; a plurality of picking stations that may include an asynchronous picking station and a synchronous picking station; one or more robots that may be configured to convey item containers to the plurality of picking stations; and at least one computerized system configured to control the conveying of the item containers based on a popularity of items included in the item containers.

The at least one computerized system may be configured to control a conveying of items of a first popularity range to the asynchronous picking station and control a conveying of items of a second popularity range to the synchronous picking station, wherein a first popularity range may include popularity levels that may be higher than popularity levels of the second popularity range.

The at least one computerized system may be configured to control an evacuation of item containers from the plurality of picking stations based on the popularity of the items included in the item containers.

The at least one computerized system may be configured to control a duration of stay of the item containers in the plurality of picking stations so that an item container provided to the asynchronous picking station stays in the asynchronous picking station for a duration that well exceeds a duration of stay of another item container stored in the synchronous picking station.

The at least one computerized system may be configured to enable a stay of an item container may store a popular item within the asynchronous picking station even during a gap in orders for the item.

The at least one computerized system may be configured to control a provision and an evacuation of popular items based on orders per a certain period of time that has a duration equivalent of a duration of fulfillment of multiple orders by the picking station, and to control a provision and evacuation of an unpopular item based on an order for the unpopular item.

The at least one computerized system may be configured to control storage locations of popular items.

The at least one computerized system may be configured to control an initial storage of at least the asynchronous picking station before a start of a shift.

The at least one computerized system may be configured to determine a popularity of items based on at least one out of open orders, and one or more order triggering events.

The at least one computerized system may be configured to determine an allocation of items per one or more item container.

The at least one computerized system may be configured to determine an allocation of concurrently ordered items per item container.

The plurality of picking stations may include different picking stations for different types of items.

The at least one computerized system may be configured to independently control a provision of items of different types to different picking stations.

The automated warehouse may include a buffering type synchronous picking station.

The buffering type synchronous picking station may include a conveyor that may be configured to concurrently support multiple item containers.

The at least one computerized system may be configured to independently control a first robot to provide a container to an input of the buffering type synchronous picking station and to take the item conveyor, from an output of the buffering type synchronous picking station.

The one or more robots may be also configured to convey item containers from the plurality of picking stations.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. An automated warehouse that comprises:
a storage configured to store multiple items, wherein the multiple items are stored in item containers;
a plurality of picking stations that comprise an asynchronous picking station and a synchronous picking station;
one or more robots that are configured to convey item containers to the plurality of picking stations; wherein the synchronous picking station is a picking station in which the one or more robots are configured and operable to: (i) wait for a picker to pick multiple items from one or more item containers, and thereafter (ii) leave the synchronous picking station with the conveyed item container; wherein the asynchronous picking station is a picking station in which the one or more robots are configured and operable to leave the conveyed item container in the asynchronous picking station and continue to its next task with another item container; and
at least one computerized system configured to control the conveying of the item containers based on a popularity of items included in the item containers.

2. The automated warehouse according to claim 1, wherein the at least one computerized system is configured to control at least one of (i) a conveying of items of a first popularity range to the asynchronous picking station and control a conveying of items of a second popularity range to the synchronous picking station, wherein a first popularity range comprises popularity levels that are higher than popularity levels of the second popularity range; (ii) an evacuation of item containers from the plurality of picking stations based on the popularity of the items included in the item containers; (iii) a duration of stay of the item containers in the plurality of picking stations so that an item container provided to the asynchronous picking station stays in the asynchronous picking station for a duration that well exceeds a duration of stay of another item container stored in the synchronous picking station; (iv) a provision and an evacuation of popular items based on orders per a certain period of time that has a duration equivalent of a duration of fulfillment of multiple orders by the picking station, and to control a provision and evacuation of an unpopular item based on an order for the unpopular item; (v) an initial storage of at least the asynchronous picking station before a start of a shift.

3. The automated warehouse according to claim 1 wherein the at least one computerized system is configured to enable a stay of an item container that stores a popular item within the asynchronous picking station even during a gap in orders for the item.

4. The automated warehouse according to claim 1 wherein the at least one computerized system is configured to control storage locations of popular items.

5. The automated warehouse according to claim 1 wherein the at least one computerized system is configured to determine at least one of (i) a popularity of items based on at least one out of open orders, and one or more order triggering events; (ii) an allocation of items per one or more item container; (iii) an allocation of concurrently ordered items per item container.

6. The automated warehouse according to claim 1, wherein the plurality of picking stations comprises different picking stations for different types of items.

7. The automated warehouse according to claim 6 wherein the at least one computerized system is configured to independently control a provision of items of different types to different picking stations.

8. The automated warehouse according to claim 1 comprising a buffering type synchronous picking station.

9. The automated warehouse according to claim 8 wherein the buffering type synchronous picking station comprises a conveyor that is configured to concurrently support multiple item containers.

10. The automated warehouse according to claim 9 wherein the at least one computerized system is configured to independently control a first robot to provide a container to an input of the buffering type synchronous picking station and to take the item conveyor, from an output of the buffering type synchronous picking station.

11. The automated warehouse according to claim 1 wherein the one or more robots are also configured to convey item containers from the plurality of picking stations.

12. A method for managing a provision of items within an automated warehouse, the method comprises:

obtaining, by at least one computerized system, information regarding items to be outputted from the automated warehouse; and controlling, based on the information, a provision, by one or more robots, of item containers to a plurality of picking stations of the automated warehouse, based on a popularity of items included in the item containers; wherein the plurality of picking stations comprise an asynchronous picking station and a synchronous picking station, wherein the synchronous picking station is a picking station in which the one or more robots are configured and operable to: (i) wait for a picker to pick multiple items from one or more item container; and thereafter (ii) leave the synchronous picking station with the conveyed item container; wherein the asynchronous picking station is a picking station in which the one or more robots are configured and operable to leave the conveyed item container in the asynchronous picking station and continue to its next task with another item container.

13. The method according to claim 12 comprising controlling at least one of (i) a provision of the item containers from the plurality of picking stations; (ii) by the at least one computerized system, a conveying of items of a first popularity range to the asynchronous picking station and controlling a conveying of items of a second popularity range to the synchronous picking station, wherein a first popularity range comprises popularity levels that are higher than popularity levels of the second popularity range; (iii) by the at least one computerized system, an evacuation of item containers from the plurality of picking stations based on the popularity of the items included in the item containers; (iv) by the at least one computerized system, a duration of stay of the item containers in the plurality of picking stations so that an item container provided to the asynchronous picking station stays in the asynchronous picking station for a duration that well exceeds a duration of stay of another item container stored in the synchronous picking station; (v) by the at least one computerized system, a provision and an evacuation of popular items based on orders per a certain period of time that has a duration equivalent of a duration of fulfillment of multiple orders by the picking station, and controlling a provision and evacuation of an unpopular item based on an order for the unpopular item; (vi) by the at least one computerized system, storage locations of popular items; (vii) by the at least one computerized system, an initial storage of at least the asynchronous picking station before a start of a shift.

14. The method according to claim 12 comprising enabling a stay of an item container that stores a popular item within the asynchronous picking station even during a gap in orders for the item.

15. The method according to claim 12, comprising determining at least one of (i) a popularity of items based on at least one out of open orders, and one or more order triggering events; (ii) an allocation of items per one or more item container; (iii) an allocation of concurrently ordered items per item container.

16. The method according to claim 12, wherein when the plurality of picking stations comprises different picking stations for different types of items, comprising independently controlling a provision of items of different types to different picking stations.

17. The method according to claim 12, comprising independently controlling a first robot to provide a container to an input of a buffering type synchronous picking station and to take an item conveyor, from an output of the buffering type synchronous picking station.

18. At least one non-transitory computer readable medium for managing a provision of items within an automated warehouse, the non-transitory computer readable medium stores instructions for:

obtaining, by at least one computerized system, information regarding items to be outputted from the automated warehouse; and controlling, based on the information, a provision, by one or more robots, of item containers to a plurality of picking stations of the automated warehouse, based on a popularity of items included in the item containers;

wherein the plurality of picking stations comprise an asynchronous picking station and a synchronous picking station.

* * * * *